United States Patent [19]

Zimmermann

[11] Patent Number: 5,155,399

[45] Date of Patent: Oct. 13, 1992

[54] COIL ASSEMBLY FOR AN ELECTROMECHANICAL ACTUATOR

[75] Inventor: Daniel E. Zimmermann, Peoria, Ill.

[73] Assignee: Caterpillar Inc., Peoria, Ill.

[21] Appl. No.: 785,722

[22] Filed: Oct. 31, 1991

[51] Int. Cl.⁵ ............................................. H02K 07/06
[52] U.S. Cl. ...................................... 310/23; 335/282
[58] Field of Search ................... 310/13, 23, 27, 34, 310/35; 335/213, 256, 282; 336/137, 222

[56] References Cited

U.S. PATENT DOCUMENTS

| | | | |
|---|---|---|---|
| 4,612,467 | 9/1986 | Clegg | 310/27 |
| 4,698,608 | 10/1987 | Kimble | 335/222 |
| 4,808,955 | 2/1989 | Godkin et al. | 335/222 |
| 4,892,328 | 1/1990 | Kurtzman et al. | 280/707 |
| 4,912,343 | 3/1990 | Stuart | 310/14 |
| 4,969,662 | 11/1990 | Stuart | 280/707 |

OTHER PUBLICATIONS

Aura Systems, Inc., The Aura Systems High Force Actuator, El Segundo, CA Jun. 1990.

*Primary Examiner*—Steven L. Stephan
*Assistant Examiner*—Judson H. Jones
*Attorney, Agent, or Firm*—David M. Masterson

[57] ABSTRACT

An electromagnetic actuator is disclosed. The acutator includes a core, a cylindrical shell disposed around the core which defines an annular space therebetween, and a magnetic assembly disposed about the core. The magnetic assembly including a pair of permanent magnets having opposite polarity. Also included is a coil which has first and second ends, first and second end portions, and an intermediate portion disposed between the first and second end portion. The first end is connected to the second end, and the coil is disposed in the annular space. Additionally, the coil has a plurality of windings wound in a common direction. The coil has electrically connectable leads at the end connection and the intermediate portion. An amplifier delivers an energization signal to the leads of the coil.

12 Claims, 3 Drawing Sheets

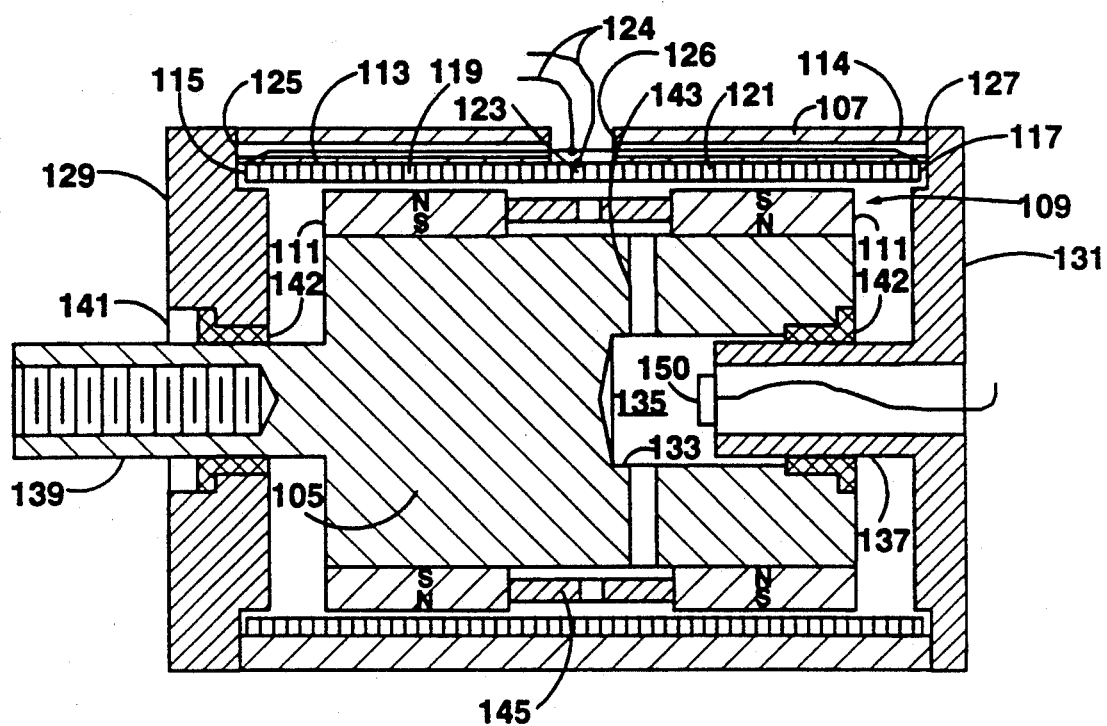
Fig_1_
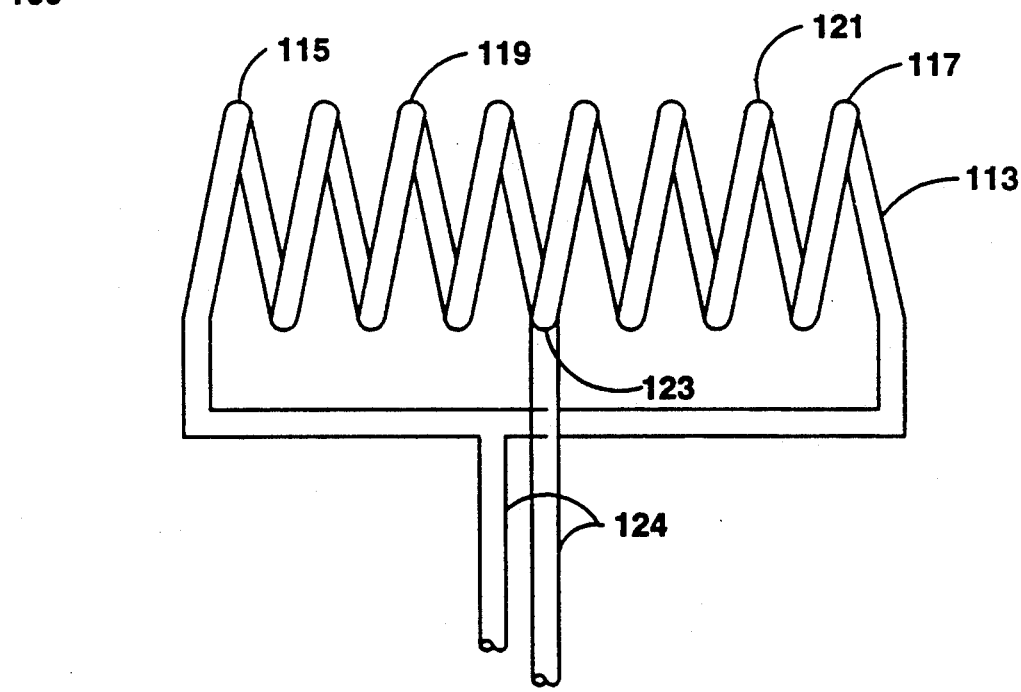
Fig_2_

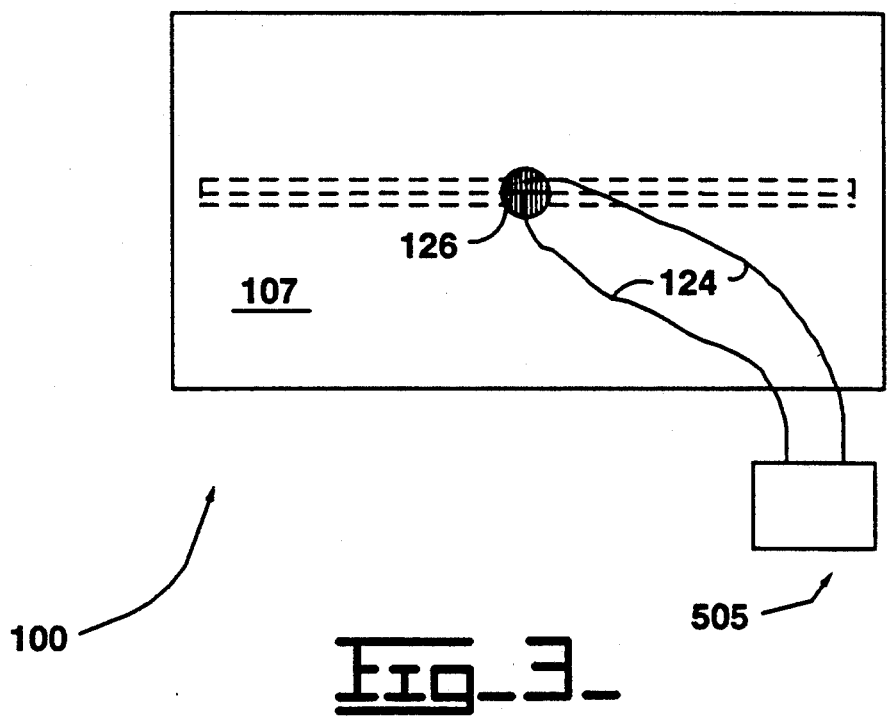
Fig_3_

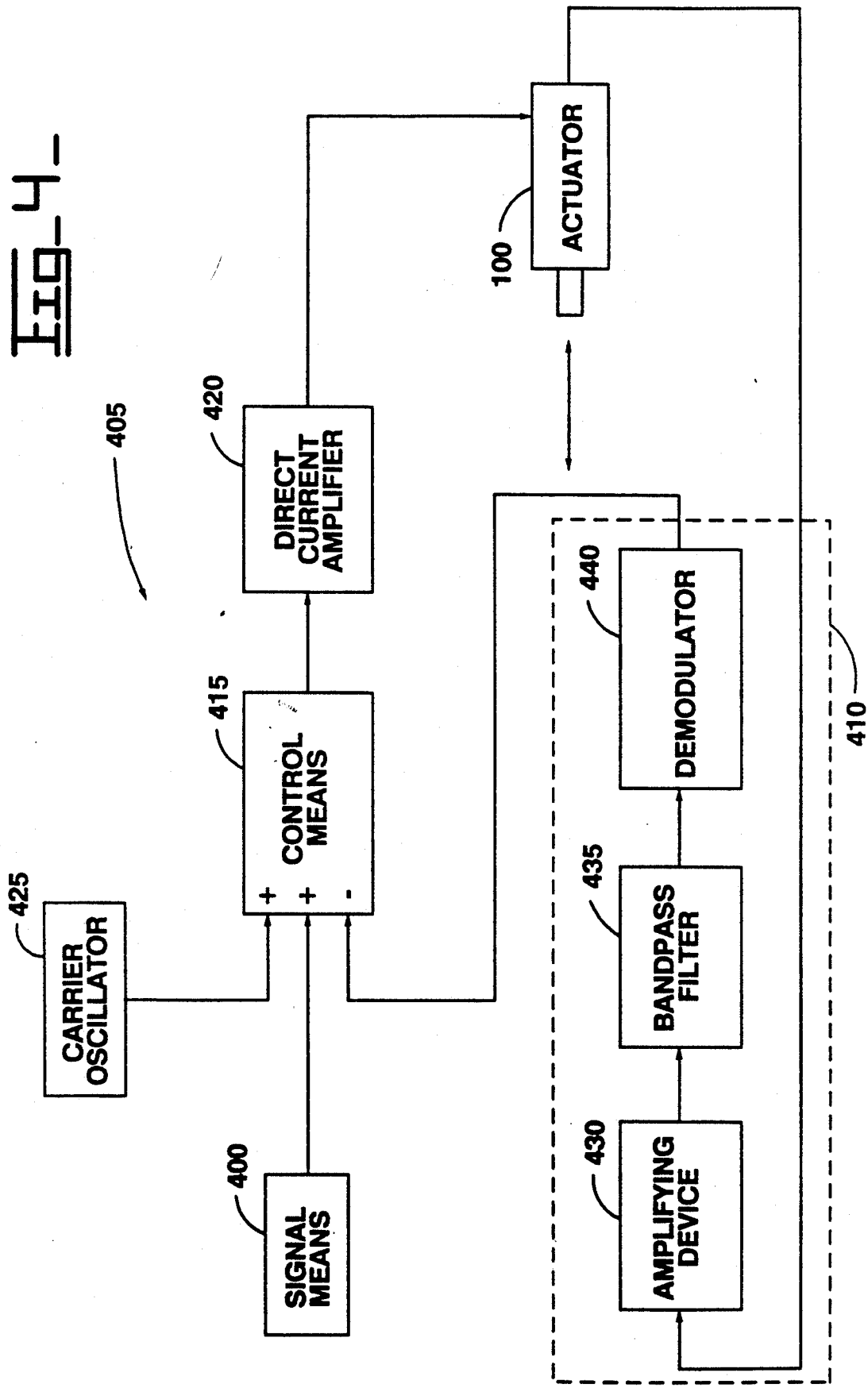

COIL ASSEMBLY FOR AN ELECTROMECHANICAL ACTUATOR

TECHNICAL FIELD

This invention relates generally to an electromechanical actuator and, more particularly, to a coil assembly for an electromechanical actuator.

BACKGROUND ART

Typically linear actuators are electromechanical devices that provide linear mechanical motion in response to receiving electrical energy. Linear actuators may be utilized in many high-force and high-precision applications. One configuration of a linear actuator consists of a cylindrical core that is free to move axially. An air gap is formed between the cylindrical core and a cylindrical shell that surrounds the core. Both the cylindrical shell and coil are made of soft iron. A pair of magnets made of permanent magnet material are affixed to opposite ends of the core. The magnets are radially magnetized and orientated on the core such that the magnets are opposite in polarity. A coil assembly is positioned circumferentially about the core. The coil assembly consists of two coils connected together in series, each coil being wound in opposite directions. Current applied to the coil generates a magnetic field, which is aided by the static magnetic field produced by the magnet pair, moving the core axially. The core moves bi-directionally in response to the orientation of the current applied to the coil.

The coil assembly described above adds unnecessary manufacturing complexity to the actuator design. For example, such an assembly requires one coil to be wound in one direction (clockwise) and while the other coil is wound in the opposite direction (counterclockwise). The process of winding two separate coils and connecting the coils adds additional manufacturing steps, adding to the overall cost of the actuator. Moreover, the inherent resistance associated with this type of coil construction is somewhat high due to the series connection of the two coils. The high resistance of the coil requires a relatively high voltage power supply to achieve a desirable power density (force output per unit volume) for the actuator. Consequently, a heavier wire is typically utilized with this type of coil assembly to lower the total resistance. However the heavier wire is more difficult to wind; yielding complex manufacturing techniques with the associated high costs.

The present invention is directed to overcoming one or more of the problems as set forth above.

DISCLOSURE OF THE INVENTION

In one aspect of the present invention, an electromagnetic actuator is disclosed. The actuator includes a core, a cylindrical shell disposed around the core which defines an annular space therebetween, and a magnetic assembly disposed about the core. The magnetic assembly including a pair of permanent magnets having opposite polarity. Also included is a coil which has first and second ends, first and second end portions, and an intermediate portion disposed between the first and second end portion. The first end is connected to the second end, and the coil is disposed in the annular space. Additionally, the coil has a plurality of windings wound in a common direction. The coil has electrically connectable leads at the end connection and the intermediate portion. An amplifier delivers an energization signal to the leads of the coil.

BRIEF DESCRIPTION OF THE DRAWINGS

For a better understanding of the present invention, reference may be made to the accompanying drawings in which:

FIG. 1 is a cross sectional view of an electromagnetic actuator incorporating aspects of the present invention;

FIG. 2 is a planar view of a coil assembly illustrating the present invention;

FIG. 3 is a planar cylindrical view of an electromagnetic actuator illustrating the present invention; and FIG. 4 is a functional illustration of the control structure associated with the present invention.

BEST MODE FOR CARRYING OUT THE INVENTION

Referring to FIG. 1 a cross sectional view of an electromechanical actuator is shown. The actuator 100 consists of a cylindrical core 105 that is free to move axially. An annular space is formed between the cylindrical core 105 and a cylindrical shell 107 that surrounds the core 105. Preferably the core 105 and the shell 107 are made of soft iron. A magnetic assembly 109 is disposed about the core 105. More particularly, the magnetic assembly 109 includes a pair cylindrical magnets 111 made from permanent magnetized material. The cylindrical magnets 111 are contiguous with the core 105 and each one of the pair is disposed at opposite ends of the core 105. Preferably the cylindrical magnets 111 are radially magnetized and orientated on the core 105 such that the magnetic cylinders 111 are opposite in polarity. The magnets 111 are made from a rare earth material and each magnet may be comprised of a plurality of individual, sectional magnets assembled to form a cylinder, as is well known. Additionally, a steel ring (not shown) may be positioned around each magnet pair securing the magnets to the core. The steel rings are especially useful for sectional-type magnets.

A coil 113 is disposed in the annular space. The coil 113 comprises one or more layers of windings of an electrical conductor wound in a common direction forming a helix. As shown in FIG. 2, a first end 115 of the coil 113 is connected to a second end 117 of the coil 113, forming an end connection. An intermediate portion 123 of the coil 113 is positioned between first and second end portions 119,121. Advantageously, the coil 113 has electrically connectable leads 124 at the end connection and the intermediate portion. Thus, the coil is said to be center tapped. The cylindrical shell 107 preferably includes a channel 114 partially filled with a nonconductive material allowing the end connection to be electrically isolated from the coil 113 and the shell 107. Further, the coil 113 is electrically isolated from the shell 107 in a well known manner.

Adverting back to FIG. 1, the cylindrical shell 107 has first and second ends 125,127. First and second end plates 129,131 are positioned adjacent the first and second ends 125,127 of the shell 107, respectively. Preferably the first and second end plates 129,131 are fastened to the shell 107 by a set of screws (not shown). The core 105 includes a bore 133 which defines a cylindrical space 135. The second end plate 131 has a cylindrical extension 137 adapted to be engageable with the bore 133 of the core 105. Advantageously, a sensing device 150 is disposed in the bore 133. The sensing device 150 is mounted on an end of the cylindrical extension 137.

Additionally, the core 105 includes a cylindrical extension 139. The cylindrical extension 139 is engageable with a bore 141 of the first end plate 129. The core 05 and the second end plate 131 each include a bushing disposed in the respective bores 133,141. Preferably the bushings 142 are made of a suitable material such as bronze or the like. A cylindrical passage 143 is drilled radially through the core 105 which extends through the bore 133. The passage allows air to travel from the cylindrical space 135 to the periphery of the core 105. Moreover, the actuator may include a spacer 145, made of aluminum, positioned between the cylindrical magnets 111. Finally, the actuator 100 may employ the use of O-rings (not shown) positioned contiguous with the end plates 129,131 and adjacent the core 105. The O-rings act as stops for the movable core 105.

Referring to FIGS. 1 and 3, the cylindrical shell 107 includes a bore 126 extending through the periphery of the shell at a location coincident with the position of the leads 124 of the coil 113. A driving means 505 is connected through the bore 126 of the shell 107 to the leads 124 of the coil 113.

FIG. 4 is a block diagram of the control structure for the actuator 100. A signal means 400 produces a desired position signal. The driving means 405 transmits an energization signal to the coil 113 in response to the desired position signal. Advantageously, the driving means 405 is connected to the leads 124 of the coil 113 so that current travels through the first end portion 119 in one direction, clockwise for example, and the current travels through the second end portion 121 in an opposite direction, counterclockwise for example. In other words the driving means 405 is connected to the leads 124 of the coil 113 providing for the energization signal to travel through the windings of the coil 113 wherein the direction of current flow within each end portion 119,121 is opposite in direction relative to the other. Consequently, a magnetic field proportional to the magnitude of the energization signal is generated. Therefore, the force generated by the energization signal travelling through the coil is additive with respect to the static force generated by the permanent magnets yielding a high force causing the core 105 to move. The core 105 is moveable in first and second directions relative to the coil 113 in response to the orientation of the energization signal.

The sensing device 150 is adapted to detect the magnetic field produced by the energized coil. Responsively the sensing device 150 produces a sensed position signal correlative to the magnitude of the magnetic field. However, the sensing device 150 does not detect the static magnetic field produced by the magnets 111. The sensing device 150 produces the sensed position signal in response to the magnetic flux density introduced to the cylindrical space 135. The magnetic flux density introduced to the cylindrical space 135 is proportional to the movement of the core 105. For example, a greater or lesser amount of magnetic flux density is introduced to the cylindrical space 135 depending on the range of movement of the core 105. Correspondingly as the dimensions of the cylindrical space 135 increase, the sensing device 150 increases the magnitude of the sensed position signal. It should be noted that the accuracy of the signal produced by the sensing device 150 corresponds to the physical geometry of the cylindrical space 135 In the preferred embodiment, the sensing device is a hall effect sensor available from Allegro Microsystems, Inc. as part no. UGS3503UA.

A signal conditioning means 410 receives the sensed position signal from the sensing device 150 and responsively produces an actual position signal which is indicative of the relative position of the core 105. A control means 415 receives the actual position signal and the desired position signal and produces an error signal responsive to a difference between the desired position signal and a sensed position signal. Correspondingly the driving means 405 transmits the energization signal in response to the error signal, causing the error signal to approach zero.

The driving means 405 includes a direct current amplifier 420. Further, the control means 415 adds a carrier oscillator frequency signal to the error signal. The direct current amplifier 420 is adapted to deliver the energization signal to the actuator 100 at the carrier frequency. The choice of the frequency of the carrier signal is high enough above the mechanical frequency response of the actuator 100 reducing the hysteresis or the dead band of the actuator 100. A typical frequency for the carrier signal is 200 Hz, for example. Advantageously the direct current amplifier 420 adjusts the energization signal in response to the resistive changes associated with the electrical conductor of the coil 113, as the temperature of the electrical conductor changes. Thus, the magnetic field generated by the energized coil 113 and the corresponding magnetic force is held to predetermined values corresponding to particular magnitudes of the energization signal. As is well known in the art, the driving means 405 may alternately consist of a pulse-width modulated amplifier without departing from the spirit of the present invention.

The signal conditioning means 410 includes an amplifying device 430 which is adapted to receive the sensed position signal from the sensing device 150 and responsively amplify magnitude thereof. The signal conditioning means 410 further includes a band pass filter 435 adapted to receive the amplified signal and responsively pass the portion of the amplified signal which corresponds to the frequency of the carrier frequency, producing a filtered signal. Moreover the signal conditioning means 410 includes a de-modulator 440 adapted to receive the filtered signal and responsively produce a direct current level signal from the filtered signal. The direct current signal is the actual position signal. The amplifying device 430, band pass filter 435 and demodulator 440 are each well known in the art and no further discussion need be made.

INDUSTRIAL APPLICABILITY

Referring to the Figures, an example is given to best illustrate the features and advantages of the present invention. Signal means 420 delivers the desired position signal, indicative of the desired position of the core 105, to the control means 415. A carrier oscillator 425 which produces a carrier signal at a frequency of 200 Hz is delivered to the control means 415. Responsive to the desired position signal, the direct current amplifier 420 produces an energization signal to the coil 113. Advantageously, the construction of the coil 113 allows current to flow through the respective end portions 119,121 of the coil 113 in opposite directions. Thus the generated magnetic field is combined with the static magnetic field produced by the magnets 111 producing a high force which acts on the core 105. A magnetic flux associated with the generated magnetic field is introduced to the cylindrical space 135. The sensing device 150 detects the magnetic flux density introduced in the cylindrical space and responsively produces a sensed position signal proportional thereof. A signal conditioning means 410 receives the sensed position signal, conditions the received signal, and produces an actual position signal indicative of the position of the core 105. In other words, the sensed position signal produced by the sensing device 150 is a A.C. voltage signal which is amplified, filtered, and de-modulated by the signal conditioning means 410 producing the actual position signal. Consequently, the control means 415 receives the actual position signal and the desired position signal and produces an error signal which is delivered to the direct current amplifier 420 along with the carrier frequency. Responsively the direct current amplifier 420 delivers the energization signal at the carrier frequency to the coil 113, thereby causing the error signal to approach zero.

As would become evident to those skilled in the art, the coil construction of the actuator is suited not only for moving core actuator designs but also may be utilized for moving coil actuator designs. Since the coil is of a single piece, with the windings wound in a common direction, the assembly time of the actuator and hence the cost is reduced over that of prior designs. Further since the effective resistance of the coil is low due to the parallel construction of the coil, the power density is relatively high even with an applied low voltage. This is especially useful with a mobile application in which the power supply is limited to a low voltage battery.

Other aspects, objects and advantages of the present invention can be obtained from a study of the drawings, the disclosure and the appended claims.

I claim:

1. An electromagnetic actuator, comprising:
   a core;
   a cylindrical shell disposed around said core defining an annular space therebetween;
   a magnetic assembly disposed about said core, said magnetic assembly including a pair of permanent magnets having opposite polarity; and
   a coil having first and second ends, first and second end portions, and an intermediate portion disposed between said first and second end portion, the first end being connected to the second end forming an end connection, said coil being disposed in said annular space and having a plurality of windings wound in a common direction, said coil having electrically connectable leads at the end connection and said intermediate portion.

2. An electromagnetic actuator, as set forth in claim 1, wherein said said core is cylindrical, and said coil encircles said core.

3. An electromagnetic actuator, as set forth in claim 2, wherein the permanent magnet pair is contiguous with said core and each one of the pair is disposed at the opposite ends of said core.

4. An electromagnetic actuator, as set forth in claim 3, wherein said core moves linearly in first and second directions with respect to said coil in response to said energization signal.

5. An electromagnetic actuator, as set forth in claim 4, wherein said shell has a bore extending through the periphery thereof at a location coincident with the position of the leads of said coil.

6. An electromagnetic actuator, as set forth in claim 5, including a driving means for delivering an energization signal to the leads of said coil, wherein said driving means is connected through the bore of said shell to the leads of said coil.

7. An electromagnetic actuator, comprising:
   a core;
   a cylindrical shell disposed around said core defining an annular space therebetween;
   a magnetic assembly about said core, said magnetic assembly including a pair of permanent magnets having opposite polarity;
   a coil having a first and second ends, first and second end portions, and an intermediate portion disposed between said first and second end portion, the first end being connected to the second end, said coil being disposed in said annular space and having a plurality of windings wound in a common direction, said coil having electrical leads at the end connection and said intermediate portion; and
   driving means for delivering an energization signal to the leads of said coil, said energization signal traveling through the windings of said coil wherein the direction of current flow within each end portion is opposite in direction relative to the other thereby generating a magnetic field proportional to the magnitude of said energization signal resulting in one of said coil and said core to move bi-directionally relative to the other.

8. An electromagnetic actuator, as set forth in claim 7, wherein said core is cylindrical, and said coil encircles said core.

9. An electromagnetic actuator, as set forth in claim 8, wherein the permanent magnet pair is contiguous with said core and each one of the pair is disposed at opposite ends of said core.

10. An electromagnetic actuator, as set forth in claim 9, wherein said core moves linearly in first and second directions with respect to said coil.

11. An electromagnetic actuator, as set forth in claim 10, wherein said shell has a bore extending through the periphery thereof at a location coincident with the position of the leads of said coil.

12. An electromagnetic actuator, as set forth in claim 11, wherein said driving means is connected through the bore of said shell to the leads of said coil.

* * * * *